(12) United States Patent
Fujinaka et al.

(10) Patent No.: US 8,703,296 B2
(45) Date of Patent: Apr. 22, 2014

(54) FUNCTIONING OPTICAL LENS AND PRODUCTION METHOD THEREOF

(75) Inventors: Toshihiko Fujinaka, Himeji (JP); Masakazu Tokunaga, Himeji (JP)

(73) Assignee: Daicel-Evonik Ltd., Tokyo (JP)

( * ) Notice: Subject to any disclaimer, the term of this patent is extended or adjusted under 35 U.S.C. 154(b) by 1436 days.

(21) Appl. No.: 11/634,244

(22) Filed: Dec. 6, 2006

(65) Prior Publication Data
US 2007/0148482 A1 Jun. 28, 2007

(30) Foreign Application Priority Data

Dec. 28, 2005 (JP) ................................. 2005-380129

(51) Int. Cl.
*B32B 27/06* (2006.01)

(52) U.S. Cl.
USPC .......... 428/474.7; 264/1.7; 264/1.32; 351/44; 351/49; 359/487.02; 428/474.4

(58) Field of Classification Search
USPC ............ 428/474.4, 474.7, 910; 264/1.7, 1.32; 359/487.02; 351/44, 49
See application file for complete search history.

(56) References Cited

U.S. PATENT DOCUMENTS

| | | | |
|---|---|---|---|
| 8,440,317 B2 * | 5/2013 | Tsukane et al. ............. | 428/474.4 |
| 2002/0044352 A1 | 4/2002 | Yamamoto et al. | |
| 2004/0125337 A1 | 7/2004 | Boulineau et al. | |

FOREIGN PATENT DOCUMENTS

| | | | |
|---|---|---|---|
| EP | 1193044 A2 | 4/2002 | |
| EP | 1193535 A1 | 4/2002 | |
| EP | 1217397 A2 | 6/2002 | |
| JP | 62-9303 A | 1/1987 | |
| JP | 63-21605 A | 1/1988 | |
| JP | 9-5683 A | 1/1997 | |
| JP | 2002-90529 A | 3/2002 | |
| JP | 2002-189199 A | 7/2002 | |
| JP | 2002-258220 A | 9/2002 | |
| WO | WO 2006040954 A1 * | 4/2006 | ............ B32B 27/34 |

OTHER PUBLICATIONS

Office Action dated Feb. 15, 2011, issued in Japanese Patent Application No. 2005-380129.
Office Action issued Nov. 15, 2011, in Japanese counterpart Patent Application No. 2005-380129.

* cited by examiner

*Primary Examiner* — Callie Shosho
*Assistant Examiner* — John Freeman
(74) *Attorney, Agent, or Firm* — Birch, Stewart, Kolasch & Birch, LLP

(57) ABSTRACT

A functioning optical lens includes a molded polyamide layer, and an optical sheet including a polyamide sheet layer and an optical film layer. Such a functioning optical lens may be prepared by bending an optical sheet including an optical film layer and a polyamide sheet layer, and injection molding a polyamide composition onto the bent polyamide sheet layer so as to thermally fuse the polyamide composition and the polyamide sheet layer with each other.

4 Claims, 2 Drawing Sheets

FUNCTIONING OPTICAL LENS AND PRODUCTION METHOD THEREOF

BACKGROUND OF THE INVENTION

1. Field of the Invention

The present invention relates to functioning optical lenses having optical functions such as an antiglare function, a dimming function, and a polarizing function. It also relates to methods of producing the functioning optical lenses. Such functioning optical lenses may be used, for example, antiglare lenses, photochromic lenses, and polarizing lenses, for example, in goggles and sunglasses.

2. Description of the Related Art

Functioning optical lenses are currently widely used and have the function of, for example, absorbing light at specific wavelengths or preventing glare caused typically by reflected light. Of these functioning optical lenses, polarizing lenses have polarizing functions and are used as sunglass lenses for preventing diffuse reflection. Japanese Unexamined Patent Application Publication (JP-A) No. 2002-90529, for example, discloses a polarizing composite lens. This lens is prepared by laminating an optically transparent nylon (polyamide) sheet onto one side of a polarizer plate with the interposition of an acrylic adhesive to yield an intermediate composite, curving the intermediate composite, and thermally fusing the optically transparent nylon (polyamide) sheet with a resin of the same composition, in which the polarizer plate includes a polarizing sheet sandwiched between two triacetyl cellulose (cellulose triacetate; TAC) layers. This technique, however, is disadvantageous in production efficiency, because such a nylon resin may not be thermally fused with TAC, and an extra nylon sheet should be arranged between the two layers.

Japanese Unexamined Patent Application Publication (JP-A) No. 2002-258220 discloses a composite molded article. This composite molded article includes a sheet polarizer, an adhesive, and a polycarbonate layer arranged in this order. The polycarbonate layer is prepared by injection molding. The sheet polarizer includes a polycarbonate (PC) protective layer, a polarizing film, and a polycarbonate stretched film. This composite molded article can be produced by a process including less steps and can be used as a polarizing lens for spectacle glasses as a result of polishing. The composite molded article is, however, poor in processability. This is because, when such a polarizing lens including a polycarbonate is processed into frame-less spectacle glasses by forming holes directly in the lens, the lens is susceptible to cracking or breaking. Polycarbonates may often undergo deformation upon injection molding. The resulting lenses containing a polycarbonate may be corroded when they are processed into spectacle glasses, because plasticizers, such as diethyl phthalate, bleed out and corrode the polycarbonate. In addition, more light-weight optical lenses are demanded.

SUMMARY OF THE INVENTION

Under these circumstances, an object of the present invention is to provide a functioning optical lens which is excellent in processability and chemical resistance, is resistant to distortion and color irregularity, and is light-weight, and a producing method thereof.

Another object of the present invention is to provide such a functioning optical lens further being resistant to blooming (whitening) and to provide a method of producing this functioning optical lens.

After intensive investigations, the present inventors have found that a functioning optical lens may be easily and conveniently obtained by molding a polyamide layer onto a polyamide sheet layer constituting an optical sheet, and that the resulting functioning optical lens has excellent optical functions, improved processability and solvent resistance, and is light-weight. The present invention has been accomplished based on these findings.

Specifically, according to an embodiment of the present invention, there is provided a functioning optical lens which includes a molded polyamide layer, and an optical sheet including a polyamide sheet layer and an optical film layer. The polyamide sheet layer and the molded polyamide layer may be directly fused with each other without the interposition of an adhesive layer. The polyamide sheet layer and the molded polyamide layer may each contain an alicyclic polyamide. The alicyclic polyamide can be, for example, a compound represented by following Formula (1):

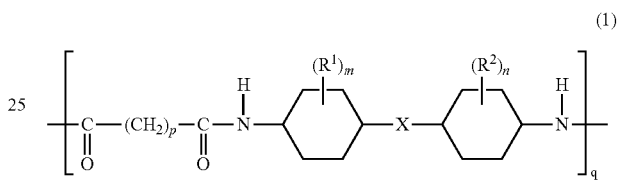

wherein X represents a direct bond, an alkylene group, or an alkenylene group; $R^1$ and $R^2$ are the same as or different from each other and each represent an alkyl group; "m" and "n" each represent an integer of 0 to 4; and "p" and "q" each represent an integer of 1 or more.

The polyamide sheet layer according to an embodiment of the present invention may include a stretched polyamide sheet. The stretched polyamide sheet can have a stretching ratio of, for example, 1.1 to 3.5. The polyamide sheet may also be a uniaxially stretched polyamide sheet.

A functioning optical lens according to an embodiment of the present invention may have a bent or curved optical sheet. A functioning optical lens according to an embodiment of the present invention may have at least one of an antiglare function and a dimming function (light control function).

According to another embodiment of the present invention, there is provided a method of producing a functioning optical lens, which includes the steps of carrying out bending of an optical sheet including an optical film layer and a polyamide sheet layer, and carrying out injection molding of a polyamide composition onto the bent polyamide sheet layer so as to thermally fuse a layer of the polyamide composition and the polyamide sheet layer with each other.

The functioning optical lens according to the present invention contains a composition of a optical film layer including polyamide sheet layer laminated to a molded polyamide, is thereby easily and conveniently obtained, and that the resulting functioning optical lens is resistant to distortion and color irregularity, has excellent optical functions, improved processability and solvent resistance, and is light-weight.

DESCRIPTION OF THE PREFERRED EMBODIMENTS

Figure 1:
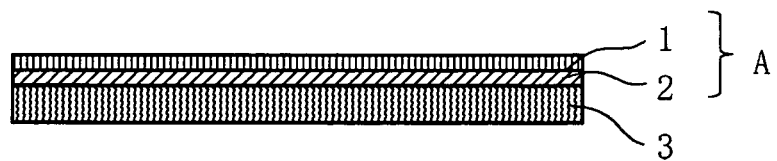
FIG. 1 is a schematic cross-sectional view of a functioning optical lens according to an embodiment of the present invention.

Some embodiments of the present invention will be illustrated with reference to the attached drawings. FIG. 1 is a schematic cross-sectional view illustrating a functioning optical lens according to an embodiment of the present invention. With reference to FIG. 1, a functioning optical lens includes an optical sheet A and a molded polyamide layer 3. The optical sheet A includes an optical film layer 1 and a polyamide sheet layer 2 arranged on or above one side of the optical film layer 1. The molded polyamide layer 3 is integrated with the polyamide sheet layer 2 constituting the optical sheet A as a result of thermal fusion.

The optical film layer 1 may be optionally selected from among films having a desired optical function. Examples of such films are antiglare films, dimming films, polarizing films, phase-contrast films, optical compensation films, brightness-improving films, optical waveguides, prism sheets, reflective sheets, and antireflection sheets. Preferred optical films herein are polarizing films and other optical films. Of such other optical films, antiglare films and dimming films are more preferred.

Materials for the optical film are not specifically limited, as long as they are thermally stable and chemically resistant resins. Among them, optically transparent resins are preferred. Such resins include thermoplastic resins, thermosetting resins, and photo-curable resins, of which thermoplastic resins are often used. Among them, preferred are optically transparent thermoplastic resins such as poly(vinyl alcohol)s, acrylic resins, ester resins, styrenic resins, polyvinyl chlorides, polyamides, and polycarbonates, of which polyamides are more preferred. When an optical film mainly contains a polyamide, the resulting lens may be excellent in processability and chemical resistance and be light-weight. Of polyamides, those excellent in optical transparency, such as alicyclic polyamides, are preferably used so as to have further improved optical functions. The optical film may further include additives such as dimming materials, light absorbers such as ultraviolet absorbers, blue-light absorbers, and infrared absorbers, colorants, thermal stabilizers, photostabilizers, antioxidants, plasticizers, flame-retarders, antistatics, and viscosity modifiers. The optical film layer 1 may contain a single layer or plural layers including films having the same or different functions.

The optical film may be prepared by molding materials into a film typically by extrusion molding or casting, and, where necessary, subjecting the film to an appropriate treatment to impart or improve optical properties. The treatment includes, for example, stretching, heating, coating, and embossing.

The antiglare films each include, for example, a base film of an optically transparent thermoplastic resin, and an antiglare layer. The antiglare layer serves to impart the function of preventing glare and structurally has convexes and concaves. Such a convex-concave structure may be formed typically by spraying of fine particles, embossing, or transferring. The antiglare layer can be formed as a layer having fine convexes and concaves, for example, by spraying droplets of an ink containing a thermosetting or photocurable resin.

The dimming films can be, for example, films molded by kneading optically transparent thermoplastic resins with dimming materials. Such dimming materials may be appropriately selected from among inorganic substances and organic substances known as materials for absorbing light at a specific wavelength. The dimming materials may also be, for example, after-mentioned substances showing photoreversibility.

The polarizing films can be prepared, for example, by doping uniaxially or biaxially stretched films with iodine or dichromatic dyes. Materials for the stretched films herein may include poly(vinyl alcohol)s (PVAs), poly(vinyl acetal)s, and poly(vinyl butyral)s. Of such stretched films, uniaxially stretched films are preferably used. The stretched films may be oriented films.

The thickness of the optical film layer 1 is, for example, about 200 μm or less, generally about 5 to about 200 μm, and preferably about 10 to about 100 μm. If the thickness is less than 5 μm, desired optical properties may not be sufficiently obtained. If it exceeds 200 μm, the resulting lens may become difficult to handle and be disadvantages in weight and cost.

The polyamide sheet layer 2 and the molded polyamide layer 3 each mainly contain a polyamide. Examples of such polyamides include polycondensed products between diamine components and dicarboxylic acid components; and polycondensed products of lactams such as caprolactam. The diamine components include, for example, aliphatic diamines such as hexamethylenediamine and trimethylhexamethylenediamine; alicyclic diamines such as bis(p-aminocyclohexyl)methane, 3,3-dimethyl-4,4-diaminodicyclohexylmethane, and 3,3-dimethyl-4,4-diaminodicyclohexylmethane; and aromatic diamines such as m-xylyleneamine. The dicarboxylic acid components include, for example, aliphatic dicarboxylic acids such as adipic acid and dodecanedioic acid; alicyclic dicarboxylic acids such as cyclohexane-1,4-dicarboxylic acid; and aromatic dicarboxylic acids such as isophthalic acid and terephthalic acid. Each of materials for constituting the polyamide sheet layer can be used alone or in combination according to the type of the optical film layer. The materials may be optically transparent or opaque, but polyamides having excellent optical transparency are preferably used.

Highly optically transparent polyamides may be obtained using, for example, alicyclic polyamides. The term "alicyclic polyamides" herein means polyamides containing at least one of an alicyclic diamine and an alicyclic dicarboxylic acid as a main component. More preferred are alicyclic polyamides each containing an alicyclic diamine and an aliphatic dicarboxylic acid as main components. Representative examples of alicyclic polyamides are alicyclic polyamides represented by Formula (1).

Such alicyclic polyamides may be commercially available as, for example, the product of Daicel-Degussa Ltd. under the trade name of "Trogamid CX7323", and the product of EMS-CHEMIE INC. under the trade name of "Grilamid TR-90".

Polyamides for use herein may be either of crystalline polyamides and non-crystalline (amorphous) polyamides. Of polyamides, preferred are polyamides having a low crystallinity as well as microcrystalline polyamides with crystal size of smaller than the wavelength of light. Amorphous polyamides including amorphous polyamides and microcrystalline polyamides are preferably used in an embodiment of the present invention for their higher optical transparency. However, crystalline polyamides being slightly opaque, such as nylon 12 (polyamide 12), can also be used.

Polyamides may each have a melting temperature of, for example, about 100° C. to about 350° C., and preferably about 100° C. to about 320° C. Among them, polyamides having crystallinity may have a melting temperature of, for example, about 150° C. to about 300° C., preferably about 150° C. to about 300° C., and more preferably about 180° C. to about 280° C.

Polyamide resins generally have high Abbe numbers and are suitable as optical materials. The Abbe number of such a polyamide for use in an embodiment of the present invention is, for example, about 35 or more, e.g., about 35 to about 65, preferably about 40 or more, e.g., about 40 to about 65, more preferably about 45 or more, e.g., about 40 to about 60, and particularly preferably about 50 or more, e.g., about 50 to about 60. The refractive index of a polyamide can be appropriately selected according to the use of the optical lens and is, for example, about 1.1 to about 2.0, preferably about 1.2 to about 1.9, and more preferably about 1.3 to about 1.8. Materials having high Abbe numbers tend to have low refractive indexes. Polyamides, however, are high both in Abbe number and in refractive index and have desirable optical functions in good balance. A functioning optical lens according to an embodiment of the present invention includes the polyamide sheet layer 2 and molded resin layer 3 each including a polyamide having the above-mentioned properties and thereby has very excellent optical properties.

Each of polyamides can be used alone or in combination in the polyamide sheet layer 2 and the molded polyamide layer 3. The two layers may include partially or fully identical polyamides or different polyamides. The polyamide sheet layer 2 and the molded polyamide layer 3 preferably each contain an alicyclic polyamide. The resulting optical lens may be excellent in optical transparency, in which the two layers can be directly fused with high adhesion.

The polyamide sheet layer 2 and the molded polyamide layer 3 may further include additives and other resin components such as thermoplastic resins within ranges not adversely affecting, for example, target optical properties and handleability of the resulting lens.

A polyamide sheet for constituting the polyamide sheet layer 2 may be formed, for example, by extrusion molding or casting. The polyamide sheet layer 2 can include, for example, an unstretched polyamide sheet, or a uniaxially or biaxially stretched polyamide sheet. The polyamide sheet layer 2 preferably includes a stretched polyamide sheet and more preferably includes a uniaxially stretched polyamide sheet. By satisfying this, the resulting functioning optical lens may be prevented or suppressed from blooming (whitening). The blooming herein is a phenomenon that an optical sheet including a specific optical film undergoes blooming (or cross blooming, a cross opaque mark) after bending. The polyamide sheet layer 2 may include an unstretched polyamide sheet, when a functioning optical lens according to an embodiment of the present invention is used as an antiglare lens.

The stretching is carried out, for example, by a roll technique, a tenter technique, or a tube technique. The stretching is carried out at temperatures of, for example, about 80° C. to about 250° C., preferably about 110° C. to about 250° C., and more preferably about 120° C. to about 200° C. The film may be stretched at a stretching ratio appropriately set according typically to the types and thicknesses of the optical film and polyamide. The stretching ratio is, for example, about 1.10 to about 3.5 times, preferably about 1.15 to about 2.8 times, and more preferably about 1.18 to about 2.5 times in at least one direction, i.e., in a longitudinal direction (machine direction (MD)) and/or a widthwise direction (transverse direction (TD)).

The thickness of the polyamide sheet layer 2 can be, for example, about 20 to about 1000 µm, preferably about 50 to about 800 µm, and more preferably about 100 to about 500 µm.

The optical film layer 1 and the polyamide sheet layer 2 may be arranged with the interposition of an adhesive. The adhesive is not specifically limited, as long as the optical film and the polyamide sheet can be bonded with each other. Examples of adhesives are acrylic adhesives, ester adhesives, urethane adhesives, ether adhesives, epoxy adhesives, and vinyl acetate adhesive. Among them, adhesives for dry lamination, such as acrylic adhesives and ester adhesives are preferred. Of such ester adhesives, ester-based polyurethane adhesives are preferred. Such adhesives may be commercially available, for example, as an acrylic adhesive, the product of Saiden Chemical Industry Co., Ltd. under the trade name of "Saivinol AT-250"; and a combination of a base resin such as an ester-based polyurethane under the trade name of "TM-595" with a curing agent under the trade names of, for example, "CAT-10L" or "CAT-RT85", each of which is available from Toyo-Morton, Ltd.

The adhesive layer after curing may have a thickness of, for example, about 0.1 to about 80 µm, generally about 1 to about 60 µm, preferably about 2 to about 50 µm, and more preferably about 5 to about 40 µm.

The optical sheet A can exhibit one or more optical functions corresponding to the optical film. It can be used, for example, as an antiglare sheet including an antiglare film; a dimming sheet including a dimming film; and/or a polarizing sheet including a polarizing film. A functioning optical lens according to an embodiment of the present invention can include an optical sheet containing a polyamide sheet layer and an optical film having a wide variety of optical functions appropriately selected. The functioning optical lens preferably includes a polarizing sheet or another optical sheet than a polarizing sheet.

Figure 2:
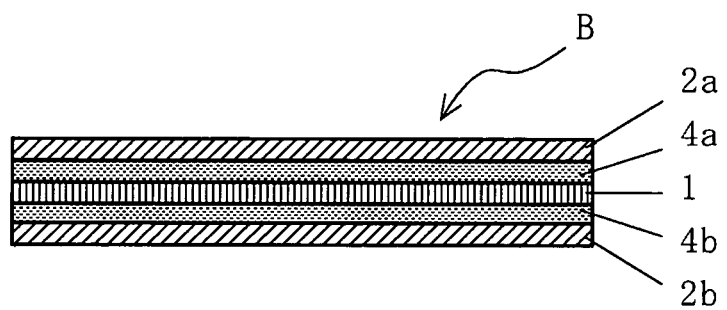
FIG. 2 is a schematic cross-sectional view showing an optical sheet constituting a functioning optical lens according to an embodiment of the present invention.

FIG. 2 is a schematic cross-sectional view illustrating an optical sheet constituting a functioning optical lens according to an embodiment of the present invention. The optical sheet B in FIG. 2 includes an optical film layer 1 arranged between two polyamide sheet layers 2a and 2b through adhesive layers 4a and 4b, respectively. The two polyamide sheet layers 2a and 2b may include polyamides of the same or different types and may have identical or different thicknesses. The optical sheet B having this configuration may exhibit good optical performance while preventing deterioration of optical performance, because the both sides of the optical film layer 1 are protected by the polyamide sheet layers 2a and 2b and are prevented typically from impact and contamination or dust.

The total thickness of an optical sheet for use in the present invention can be appropriately selected according to the use and is, for example, about 200 to about 2500 µm, and preferably about 300 to about 2000 µm. The surfaces of the optical sheet may be subjected to a surface treatment for improving the adhesion with another layer. The surface treatment includes, for example, corona discharge treatment, plasma treatment, and anchor coating.

An optical sheet according to an embodiment of the present invention may be subjected to bending. In this case, the optical sheet has only to be subjected to bending at least partially. A desired mold such as one having a curved surface may be used as a processing device. The bending may be carried out while heating the optical sheet. The heating temperature herein may be lower than about 200° C., for example, about 80° C. or higher and lower than about 200° C., preferably about 90° C. to about 190° C., and more preferably about 100°

C. to about 180° C. A mold, if used, may be heated to a temperature near to the heating temperature of the optical sheet.

The resulting bent optical sheet can be preferably used as a polarizing sheet, as well as another optical sheet such as an antiglare sheet or a dimming sheet. The optical sheets having these properties are suitable as materials of lenses having corresponding optical functions.

The molded polyamide layer 3 is a molded resin layer formed by subjecting a polyamide composition to molding or forming using a mold. In other words, the molded polyamide layer 3 is an unstretched resinous molded article. The polyamide composition has only to include a polyamide as a main component. The polyamide composition may include a polyamide or polyamides alone or may include a mixture of a polyamide or polyamides with other resins than polyamides, such as thermoplastic resins, and additives, within ranges not deteriorating advantages according to an embodiment of the present invention.

The molded polyamide layer 3 can be arranged according to any procedure. For example, it may be directly fused with the optical film layer 1 or with the polyamide sheet layer 2. It is also acceptable that a molded polyamide layer 3 is previously molded and the resulting molded polyamide layer 3 is arranged over the optical film layer 1 or the polyamide sheet layer 2 with the interposition of, for example, an adhesive layer. According to an embodiment of the present invention, the molded polyamide layer 3 is preferably arranged on or over the polyamide sheet layer 2 and is more preferably directly fused with the polyamide sheet layer 2. According to this technique, the polyamide sheet layer 2 and the molded polyamide layer 3 can be directly fused with each other. In this case an extra resin sheet layer or an adhesive layer may not be used. This is because the sheet layer 2 and the molded layer 3 each include a polyamide as a main component and thereby have good affinity for each other. Accordingly, functioning optical lenses can be efficiently produced at low cost, because they can be produced through less steps. They are prevented, for example, from deterioration in optical functions due to an extra adhesive layer. The polyamide sheet layer 2 and the molded polyamide layer 3 can be integrated with high adhesion. Thus, the lenses may have excellent optical functions.

The molded polyamide layer 3 can be formed according to any forming or molding process. Examples of such molding procedures are compression molding, transfer molding, extrusion molding, injection molding, and injection-compression molding. The molding or forming process may include the step of heating and melting a polyamide composition. The polyamide composition may be melted at temperatures of, for example, about 180° C. to about 350° C., preferably about 200° C. to about 330° C., and more preferably about 230° C. to about 320° C. If the polyamide composition is melted at excessively low temperatures, it is difficult for the resulting melt to have such flowability as to be satisfactorily placed in a mold. In contrast, if the polyamide composition is melted at excessively high temperatures, the resin may deteriorate.

The thickness of the molded polyamide layer 3 may be selected within ranges not adversely affecting, for example, the handleability and optical functions. The thickness is, for example, about 200 to about 5000 µm, and preferably about 300 to about 3000 µm.

According to an embodiment of the present invention, the content of the polyamide(s) is, for example, about 70 percent by weight or more, preferably about 80 percent by weight or more, more preferably about 90 percent by weight or more, and particularly preferably 95 percent by weight or more of the total weight of the functioning optical lens. If the content of the polyamide is less than 70 percent by weight, the lens may have insufficient processability and chemical resistance and may not have a sufficiently light weight. The content of the polyamide to the total of the functioning optical lens means the ratio of the weight of polyamides contained in the polyamide sheet layer 2 and the molded polyamide layer 3 to the total weight of the functioning optical lens.

A functioning optical lens according to an embodiment of the present invention is resistant to cracking, even when an opening or hole is directly formed therein, and is excellent in processability. This is because the sheet layer 2 and the molded resin layer 3 each contain a polyamide as a main component. A functioning optical lens according to an embodiment of the present invention is excellent in chemical resistance. This functioning optical lens is avoided from problems caused by contact with chemical substances, such as plasticizers. Such chemical substances are contained in other members used in combination with the functioning optical lens for constituting, for example, spectacle glasses. Such functioning optical lenses according to an embodiment of the present invention can be subjected to a variety of processing. In addition, they are excellent in chemical resistance and can be used in combination with other materials containing, for example, plasticizers. Consequently, they can be applied to a wide variety of uses and may have a sufficiently small weight.

Respective layers constituting functioning optical lenses may further contain additives according to necessity. Such additives include, for example, dimming materials such as photoreversible compounds, light absorbers such as ultraviolet absorbers, blue-light absorbers, and infrared absorbers, colorants, thermal stabilizers, light stabilizers, antioxidants, plasticizers, flame-retarders, antistatics, and viscosity modifiers.

A functioning optical lens according to an embodiment of the present invention preferably has an antiglare function and/or a dimming function. These optical functions may be imparted to functioning optical lenses, for example, by using optical sheets having corresponding optical functions. For example, a functioning optical lens can have an antiglare function by using an antiglare sheet, and can have a dimming function by using a dimming sheet. Functioning optical lenses having a dimming function include, for example, functioning optical lenses having photoreversibility.

Specifically, such photoreversible functioning optical lenses each contain a photoreversible compound added to at least one of respective layers constituting the functioning optical lenses. The photoreversible compound is not specifically limited and can be any one, as long as it is a substance having a structure varying depending on the wavelength of light and having a varying absorption spectrum. Such photoreversible compounds include, for example, organic substances including photochromic compounds; inorganic substances such as rare-earth elements; and inorganic-organic composites such as organic complexes of inorganic substances. The photochromic compounds include, for example, dimming dyes such as azobenzenes, spiropyrans, spirooxazines, diarylethenes, and chromenes. The rare-earth metals include, for example, cerium, terbium, and europium. Functioning optical lenses having homogenous photoreversible functions may be easily obtained by using photoreversible optical sheets.

Specific examples of photoreversible optical sheets are dimming sheets each including a polyamide sheet and a dimming film containing a photoreversible compound as a dimming material; optical sheets having a dimming function, each of which includes a polyamide sheet and an optical film such as a dimming film or an antiglare film arranged with the interposition of an adhesive containing a photoreversible compound; and optical sheets having a dimming function, each of which includes an optical film arranged between two polyamide sheets, one of the two polyamide sheets contains a photoreversible compound and the other does not.

Figure 3:
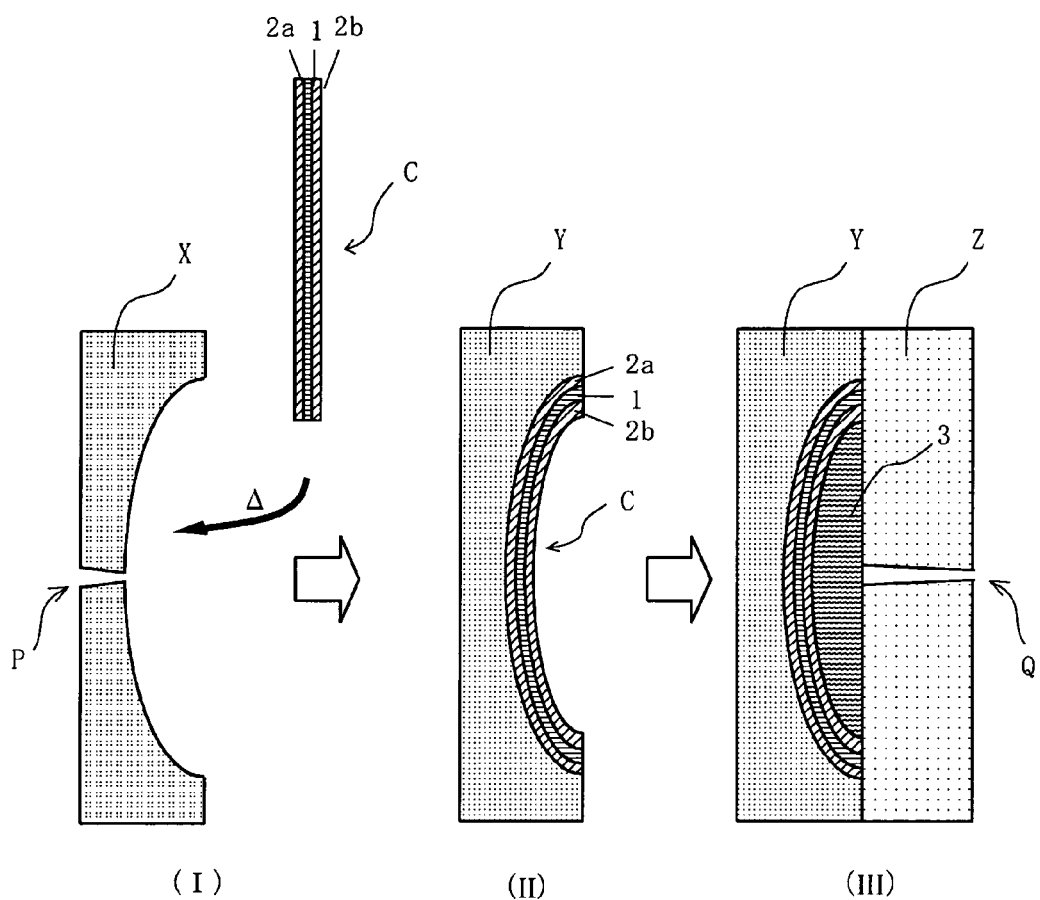
FIG. 3 schematically illustrates steps of a method producing a functioning optical lens according to an embodiment of the present invention.

FIG. 3 schematically illustrates the steps of a method of producing a functioning optical lens according to an embodiment of the present invention. FIG. 3 shows a series of the steps of preparing a functioning optical lens. These steps include (I) bending an optical sheet C using a bending mold X; (II) placing the bent optical sheet C in an injection-molding mold Y; and (III) thermally fusing a polyamide composition with the optical sheet C using injection-molding molds Y and Z to thereby yield the functioning optical lens. The optical sheet C includes polyamide sheet layers $2a$ and $2b$ and an optical film layer 1 arranged between the polyamide sheet layers $2a$ and $2b$ through an adhesive (not shown).

The step of bending (I) may be carried out in the following manner. A flat optical sheet C is heated to such a temperature that the optical sheet C can be molded. For example, the optical sheet C is heated to a temperature of about 130° C. The heated optical sheet C is placed in a bending mold X, and evacuation is carried out through a vacuum port P in the mold X to thereby mold the optical sheet C to be in accordance with the concave shape of the mold X. The bending may be carried out according to a conventional procedure for molding with heating, such as vacuum molding or compression molding. The bending is preferably carried out by vacuum molding.

The injection molding may be carried out by placing the optical sheet C after the bending step (I) in an injection-molding mold Y (Step (II)); placing a mold Z on the mold Y; heating and melting a resin composition for constituting a molded polyamide layer 3 at temperatures of, for example, around 280° C.; and injecting the molten resin composition into the mold Z through an injection port Q. By these steps, a polyamide composition can be integrally thermally fused with a polyamide sheet layer constituting an optical sheet, and a good molded article can be obtained even without using an adhesive. The molded polyamide layer 3 is arranged on a concave side (inner side) of the curved or bent optical sheet in the embodiment shown in FIG. 3. The layer configuration is, however, not limited to this, and the molded polyamide layer 3 may be arranged on a convex side (outer side) or on both sides of the optical sheet. The molded polyamide layer is preferably arranged on a concave side (inner side) of the optical sheet. Injection molding using a polycarbonate according to a technique in the related art, often invites distortion, and the distortion may lead to color irregularities such as interference fringe patterns. In contrast, according to an embodiment of the present invention using a polyamide composition, functioning optical lenses having excellent optical properties can be obtained while suppressing distortion caused as a result of injection molding and inhibiting color irregularities caused by distortion. Such an embodiment according to the present invention is advantageous particularly when a bent optical sheet C is used, because lenses having excellent optical functions can be obtained while suppressing distortion and color irregularities according to this technique.

According to a method of an embodiment of the present invention, a polyamide sheet layer of an optical sheet after bending can be easily, conveniently, and stably fused with a molded polyamide layer.

The resulting multilayer molded article may be subjected to processing on at least one of its sides. The processing includes, for example, hard coating, antireflection processing, antifogging processing, soil resistant finish, and specular working. Each of these processings can be carried out alone or in combination.

The hard coating may be carried out by applying a thermosetting or photocurable resin to a surface of the target article and curing the resin. The hard coated layer may have a thickness of, for example, about 0.5 to 15 μm The antireflection processing may be carried out by forming one or more layers of inorganic substances, such as silica, or organic substances according typically to a sol-gel process or vacuum vapor deposition process. The antifogging processing may be carried out typically by applying a hydrophilic resin. The soil resistant finish may be carried out typically by applying an organofluorine compound according to vacuum vapor deposition. The specular working may be carried out, for example, by applying a metal such as aluminum according to vapor deposition.

Functioning optical lens according to an embodiment of the present invention may be used as, for example, antiglare lenses, dimming lenses, polarizing lenses, phase-contrast lenses, optical-compensation lenses, brightness-improving lenses, optical waveguides, prism lenses, reflective lenses, and antireflection lenses. These functioning optical lenses may be widely used as parts constituting optical devices such as spectacle glasses, microscopes, lighting equipment, and radiation generators. According to an embodiment of the present invention, polarizing lenses, as well as other functioning optical lenses are preferably used. Among them, antiglare lenses, dimming lenses, photoreversible antiglare lenses, photoreversible dimming lenses are preferably used as sunglasses, spectacle glasses, and goggles. They are further preferably used as frame-less spectacle glasses.

The present invention will be illustrated in further detail with reference to several examples below. It should be noted, however, these examples are illustrated only by example and should by no means limit the scope of the present invention.

Example 1

An antiglare film about 50 μm thick was prepared by molding a mixture using a film extruder [the product of PLA GIKEN Co., Ltd. having a screw with a diameter of 30 mm] adjusted at 250° C. to 320° C. The mixture used herein contains 100 parts by weight of a polyamide [the product of Daicel-Degussa Ltd. under the trade name of "Trogamid CX7323"], 0.4 part by weight of an ultraviolet absorber [the product of Johoku Chemical Co., Ltd., under the trade name of "JF-86"], 0.007 part by weight of a blue-light absorber [the product of Nippon Kayaku Co., Ltd. under the trade name of "Kayaset Yellow A-G"], 0.012 part by weight of an infrared absorber [the product of Dainippon Ink and Chemicals, Inc. under the trade name of "IR Additive 200"], and 0.002 part by weight of a compound represented by following Formula:

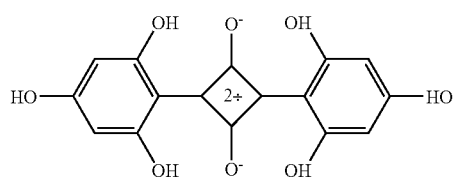 [SMILES: [O-]C1C(c2c(O)cc(O)cc2O)C([O-])C1c1c(O)cc(O)cc1O]

Next, an antiglare sheet A was prepared by applying uniaxially stretched polyamide films to both sides of the above-prepared antiglare film through adhesive layers, respectively. The uniaxially stretched polyamide films each contain a polyamide [the product of Daicel-Degussa Ltd. under the trade name of "Trogamid CX7323"]. This polyamide has an Abbe number of 45 and a glass transition temperature of 140° C. The adhesive layers each have a thickness of about 20 μm and contain an adhesive composition. The adhesive composition is a 5:1 mixture of the products "TM-595" and "CAT-10L" available from Toyo-Morton Co., Ltd., which mixture had been diluted with ethyl acetate to two times. The polyamide films each have a thickness of about 200 μm and are stretched at a stretching ratio of 1.2 times. The resulting antiglare sheet A has a layer configuration of [(polyamide film 1a)/(adhesive 4a)/(antiglare film 2)/(adhesive 4b)/(polyamide film 1b)].

The prepared antiglare sheet A was subjected to bending by heating to about 100° C., placing the heated sheet in a concave mold, and evacuating from a suction port in the lower part of the mold.

A antiglare lens was then prepared by placing the resulting curved antiglare sheet A in a lens-shaped injection-molding mold, and injecting a polyamide into the mold. The polyamide had been heated and melted at 300° C. before injection. The polyamide herein is the same polyamide as above. In the antiglare lens, a molded polyamide layer 3 is directly thermally fused with the polyamide film 1b in the curved antiglare sheet A. The antiglare lens has a configuration of [(polyamide film 1a)/(adhesive 4a)/(antiglare film 2)/(adhesive 4b)/(polyamide film 1b)/(molded polyamide layer 3)].

Example 2

A polarizing sheet was prepared, and a polarizing lens was then prepared using the polarizing sheet by the procedure of Example 1, except for using a poly(vinyl alcohol) polarizing film [the product of Nitto Denko Co., Ltd.] about 40 μm thick instead of the antiglare film.

Example 3

An antiglare sheet was prepared, and an antiglare lens was prepared using the antiglare sheet by the procedure of Example 1, except for using a polyamide film having a stretching ratio of 2.5 times as the polyamide film. The polyamide film has the same parameters as the polyamide film used in Example 1, except for the stretching ratio.

Example 4

An antiglare sheet was prepared, and an antiglare lens was prepared using the antiglare sheet by the procedure of Example 1, except for using an unstretched polyamide film as the polyamide film. The unstretched polyamide film has the same parameters as the polyamide film used in Example 1, except for the stretching ratio.

Example 5

A polarizing/dimming sheet was prepared, and a polarizing/dimming lens was then prepared using this polarizing/dimming sheet by the procedure of Example 1, except for the following points. An adhesive containing a dimming dye was applied to a thickness of about 30 μm to one side of a polarizing film, and another adhesive containing no dimming dye was applied to a thickness of about 30 μm to the other side. The former adhesive contains an adhesive [the product of Saiden Chemical Industry Co., Ltd. under the trade name of "Saivinol AT-245"] combined with 10 percent by weight in terms of solid content of a spirooxazine dimming dye (1,3,3,5,6-pentamethylspiro[indolino-2,3'[3H]-naphtho(2,1b)(1,4)oxazine)]. The latter adhesive contains the product of Saiden Chemical Industry Co., Ltd. under the trade name of "Saivinol AT-245" alone.

Comparative Example 1

An antiglare lens was prepared by the procedure of Example 1 using the antiglare sheet containing the antiglare film and the polyamide sheet layer used in Example 1, except for forming, as a molded resin layer, a molded polycarbonate (PC) layer using a polycarbonate instead of the polyamide. The polycarbonate is the product of Idemitsu Petrochemical Co., Ltd. and has an average degree of polymerization of 80, an Abbe number of 29, and a glass transition temperature of 145° C. The resulting antiglare lens has a configuration of [(polyamide film 1a)/(adhesive 4a)/(antiglare film 2)/(adhesive 4b)/(polyamide film 1b)/(molded polycarbonate (PC) layer)].

Evaluation Tests

Processability

A through hole 2 mm in diameter was opened in the lenses prepared according to Examples 1 to 5 and Comparative Example 1 using a lens perforator (the product of Kubota Seiki Co., Ltd., Model DM-3). As a result, the lens according to Comparative Example 1 showed a multiplicity of cracks around the through hole and had poor processability. In contrast, the lenses according to Examples 1 to 5 showed no cracking and had excellent processability.

Chemical Resistance

The lenses prepared according to Examples 1 to 5 and Comparative Example 1 were left stand at room temperature for sixty days while the molded resin layer of the lenses was kept in contact with a molded resin article (cellulose acetate resin) containing 25 percent by weight of diethyl phthalate as a plasticizer. As a result, the lens according to Comparative Example 1 was whitened at the contact portion. In contrast, the lenses according to Examples 1 to 5 showed no whitening and were excellent in chemical resistance.

Distortion

Images seen in the surfaces of the lenses prepared according to Examples 1 to 5 and Comparative Example 1 were visually observed. As a result, the lens according to Comparative Example 1 showed distortion in the image and showed interference fringe patterns on its surface. In contrast, the lenses according to Examples 1 to 5 showed neither distortion in image nor interference fringe patterns.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A functioning optical lens comprising:
a molded polyamide layer;
a first polyamide sheet layer, a second polyamide sheet layer, and an optical film layer, arranged between the polyamide sheet layers;
wherein the polyamides in both of the polyamide sheet layers and the molded polyamide layer are alicyclic polyamides, wherein the first polyamide sheet layer comprises a stretched polyamide sheet, and said stretched polyamide sheet has an uniaxially stretching ratio of 1.1 to 3.5;

wherein the second polyamide sheet layer comprises a stretched polyamide sheet having a uniaxially stretching ratio of 1.1 to 3.5;

wherein one surface of said first polyamide sheet layer is directly fused with said molded polyamide layer without the interposition of an adhesive layer;

wherein said optical film layer is directly bonded to said first polyamide sheet layer by an adhesive;

wherein said optical film layer is directly bonded to said second polyamide sheet layer by an adhesive; and wherein said optical film layer consists of a film selected from the group consisting of:

(1) an antiglare film including a base film of an optically transparent thermoplastic resin, and an antiglare layer having a convex-concave structure formed by spraying of fine particles, embossing, or transferring;

(2) a dimming film molded by kneading optically transparent thermoplastic resins with a dimming material selected from inorganic substances and organic substances as a material for absorbing light at a specific wavelength; and (3) a polarizing film prepared by doping an uniaxially or biaxially stretched film with iodine or dichromatic dyes wherein the material for the stretched film is selected from the group consisting of poly(vinyl alcohol)s (PVAs), poly(vinyl acetal)s, and poly(vmayl butyral)s.

2. The functioning optical lens according to claim 1, wherein the alicyclic polyamide is a compound represented by following Formula (1):

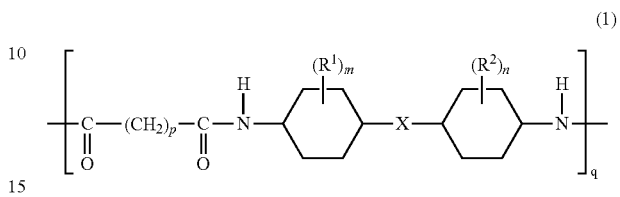

wherein X represents a direct bond, an alkylene group, or an alkenylene group; $R^1$ and $R^2$ are the same as or different from each other and each represent an alkyl group; "m" and "n" each represent an integer of 0 to 4; and "p" and "q" each represent an integer of 1 or more.

3. The functioning optical lens according to claim 1, wherein the first polyamide sheet layer, the second polyamide sheet layer, and the optical film layer are bent or curved.

4. The functioning optical lens according to claim 1, wherein the functioning optical lens has at least one of an antiglare function and a dimming function.

* * * * *